United States Patent Office 3,010,986
Patented Nov. 28, 1961

3,010,986
ALKYL SUBSTITUTED PHOSPHONATE BIOCIDAL COMPOUNDS
Theodor Reetz, Webster Groves, Mo., assignor to Monsanto Chemical Company, St. Louis, Mo., a corporation of Delaware
No Drawing. Filed Nov. 10, 1958, Ser. No. 772,666
9 Claims. (Cl. 260—461)

This application relates to a new class of chemical compounds and a process for their preparation.

It is an object of this invention to provide new chemical compounds having utility as biocides. A further object is to provide a method for the preparation of these new and useful compounds. Additional objects will be evident from the following specification.

The new class of compounds have the following structure

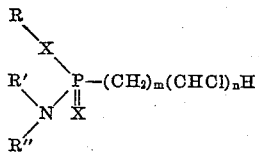

where X is a member selected from the group consisting of oxygen and sulfur, R is a member selected from the group consisting of cyclohexyl and an alkyl radical having from 1 to 8 carbon atoms, R' is a member selected from the group consisting of an allyl radical, hydrogen and alkyl radicals having from 1 to 4 carbon atoms, and R" is a member selected from the group consisting of an allyl radical, hydrogen, and alkyl radicals having from 1 to 4 carbon atoms, $n$ is an integer from 0 to 1, $m$ is an integer from 0 to 2 and the sum of $m+n$ is at least 1.

The compounds of this invention find utility as biocides and have proven particularly effective as systemic insecticides, nematocides, and herbicides. Specifically the preferred compounds of this invention are those in which R above has at least three carbon atoms. Illustrations of the manner in which these compounds operate as biocides will be shown in the examples that follow.

The compounds of the present invention are prepared as follows. An alcohol of the type ROH or mercaptan of the type RSH where R is a member selected from the group consisting of cyclohexyl and an alkyl radical having from 1 to 8 carbon atoms is reacted with a phosphonyl compound of the structure

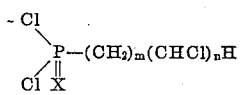

where $m$ is an integer from 0 to 2, $n$ is an integer from 0 to 1, X is a member selected from the group consisting of oxygen and sulfur, and the sum of $m$ plus $n$ is at least 1 in the presence of a suitable inert organic solvent such as ether, at a temperature of —5° C to 40° C. for a period of 1 to 3 hours with constant stirring. A scavenger or hydrogen chloride acceptor may or may not be used depending on whether the hydrogen chloride formed must be disposed of. The resulting mixture may then be stirred for additional periods up to 3 hours. Thereafter an amine of the structure

where R' is a member selected from the group consisting of an allyl radical, hydrogen and alkyl radicals having from 1 to 4 carbon atoms and R" is a member selected from the group consisting of an allyl radical, hydrogen and alkyl radicals having from 1 to 4 carbon atoms, is added to the above reaction mixture under the same conditions of stirring, time and temperature set forth above. A scavenger agent may then be added to the reaction mixture which agent may consist of an excess of the above amine. From this reaction mixture the desired product is isolated.

Numerous modifications of the above processes may be made without departing from the nature of this invention such as the use of various tertiary amines as scavenger agents including triethylamine, dimethylaniline, pyridine, trimethylamine, and the like. Similarly any inert organic solvent may be used such as ether, xylene, hexane and the like.

According to the invention examples of the methods whereby the compounds of this invention may be prepared are as follows:

*Example 1*

Cyclohexyl dimethylamidomethanephosphonate

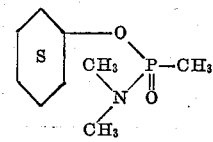

A mixture of 100.0 g. cyclohexanol and 101.0 g. triethylamine is added to a solution of 133.0 g. methyl phosphonyl dichloride ($CH_3POCl_2$) in 1000.0 ml. ether at —5° C. over a period of 1½ hours. The resulting reaction mixture is then stirred in the next 2 hours while the reaction mixture is cooled to 0° C. The resulting reaction mixture is stirred for an additional 2 hours at 25° C. Then 90.0 g. dimethylamine is added at 0° C. The entire reaction mixture is then heated to 25° C. for 3 hours. The resulting precipitate is filtered, and the filtrate is distilled whereby there is obtained 140.4 g. of cyclohexyl dimethylamidomethanephosphonate (hereafter referred to as CDAMP) B.P. 82–84°C./0.1 mm. Hg.

The biocidal activity of this compound as a systemic insecticide against the cotton aphid, *Aphis gossypii*, is illustrated by the following experiment. Concentrations of CDAMP in the amount of 0.004 percent, 0.002 percent, and 0.001 percent, respectively were made by dissolving the appropriate amount of CDAMP in tap water in a test tube and thereafter inserting one stem of cucumber with cotyledon leaves. This test set is then placed in an incubation chamber for 72 hours. At the end of that time the entire cucumber stem is placed on paper towelling and the cucumber cotyledons are infested with 10 mature wingless agamic cotton aphids. The infected cucumber stem is then placed in an insectary at 77° F. for 48 hours when mortality observations are made. The results are as follows:

| Percent Concentration | Percent Kill of Aphids |
|---|---|
| 0.004 | 100 |
| 0.002 | 90 |
| 0.001 | 70 |

As a control a cucumber stem with cotyledon leaves inserted in a test tube with tap water only had no effect on a similar test group of ten aphids.

Example II

Isopropyl dimethylamidomethanephosphonate

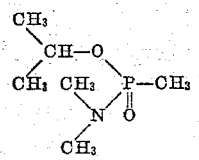

Employing the same procedure as set forth in Example I but substituting 60.0 g. of isopropyl alcohol for the cyclohexanol, there is obtained 123 g. isopropyl dimethylamidomethanephosphonate (hereafter referred to as ADAMP), at 48° C./1 mm. Hg.

The biocidal activity of this compound as a nematocide against *Panagrellus redivious*, a nematode, is illustrated by the following experiment. Test solutions of ADAMP in water in the amount of 0.2 percent and 0.02 percent are then prepared. Approximately 2.5 mls. of a suspension containing about 50 nematodes are placed in each of three Stender dishes. To one Stender dish is added 2.5 mls. of the 0.2 percent solution and to another Stender dish is added 2.5 mls. of the 0.02 percent solution resulting in a concentration of ADAMP of 0.1 percent and 0.01 percent, respectively. The third Stender dish serves as a control. When the ADAMP is added to the nematode containing Stender dishes, a timer is started and the organisms are examined under a sterescope-microscope for motility at the intervals set forth below and the degree of motility observed on all three Stender dishes. The results are as follows:

| Percent Motility | Percent Concentrations | | Control |
| --- | --- | --- | --- |
| | 0.1% | 0.01% | |
| After: | | | |
| 10 min | 100 | 100 | 100 |
| 20 min | 90 | 100 | 100 |
| 30 min | 80 | 100 | 100 |
| 60 min | 50 | 80 | 100 |
| 2 hrs | 1 | 50 | 100 |
| 24 hrs | 0 | 0 | 100 |

Example III

Octyl dimethylamidoethanephosphonate

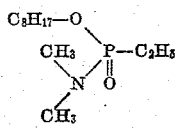

Employing the same procedure as Example I but substituting 130.0 g. of octyl alcohol for the cyclohexanol, and substituting 147.0 g. ethyl phosphonyl dichloride, octyl dimethylamidoethanephosphonate is obtained in good yield.

Example IV

Cyclohexyl dimethylamidochloromethanephosphonate

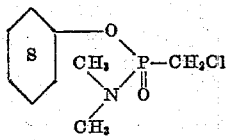

To 6.5 g. sodium is added 33.0 g. cyclohexanol in the presence of 300.0 ml. xylene. Thereafter 49.0 g. dimethylamidochloromethylphosphonyl chloride

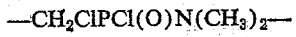
—CH$_2$ClPCl(O)N(CH$_3$)$_2$— is added at 15° C. over a period of 1 hour and the resulting reaction mixture stirred at room temperature to complete the reaction. The sodium chloride formed is removed by washing with water. After drying the xylene is removed by washing under reduced pressure to obtain 51.1 g. cyclohexyl dimethylamidochloromethanephosphonate (B.P. 88–89° C./0.02 mm. Hg) hereafter referred to as CDMACP.

This compound is effective as a pre-emergent herbicide as evidenced by the following experiment. A soil plot is selected having a good grade of top soil. The soil surface thereof is then compacted to a depth of ⅜″ from the top by means of a template-tamper. Grass seeds of the type set forth below are then planted in this soil and thereafter covered with ⅜″ of soil. The plot is then sprayed with acetone containing an amount of CDMACP, which is equivalent to an application of 25 pounds of CDMACP per acre. Ten days after application of the CDMACP the number of plants of each species which germinated and grew were noted. Abnormalities of any kind were then noted with the following results:

| Plant | Extent of Phytotoxicity |
| --- | --- |
| Wild oat | 3 |
| Foxtail | 3 |
| Barnyard grass | 3 |
| Domestic rye grass | 3 |
| Pigweed | 3 |
| Wild morning glory | 3 |
| Crabgrass | 3 |

Rating key:
- no phytotoxicity __ 0
- slight __ 1
- moderate __ 2
- severe __ 3

As a control the same plants were sprayed with the acetone solution alone and showed no phytotoxicity.

Example V

Cyclohexyl methylamidomethanephosphonate

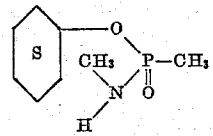

A solution of 100.0 g. cyclohexanol in 100 ml. ether is added to a solution of 133 g. methane phosphonyl dichloride, CH$_3$POCl$_2$, in 1000 ml. ether with stirring over a period of 2 hours at 0° C. Thereafter 72 g. methyl amine, CH$_3$NH$_2$, is added under the same conditions of stirring, time and temperature as recited above. The resulting precipitate is filtered. After ether was removed by distillation a colorless oil of cyclohexyl methylamidomethylphosphonate was obtained. (B.P. 125–126°C./0.5 mm. Hg.) Yield: 128 g.=67 percent theory.

By substituting cyclohexyl methylamidomethylphosphonate for CDAMP but otherwise using the same testing procedure against *Aphis gossypii* as set forth in Example I, the following results are obtained:

| Percent Concentration | Percent Kill of Aphids |
| --- | --- |
| 0.004 | 100 |
| 0.002 | 70 |
| 0.001 | 67 |

As a control a cucumber stem with cotyledon leaves inserted in a test tube with tap water only had no effect on a similar test group of ten aphids.

Example VI

Cyclohexyl diallylamidochloromethanephosphonate

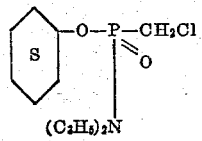

A mixture of 100.0 g. cyclohexanol, 101.0 g. triethylamine, and 200 ml. n-hexane is added to a solution of 167.5 g. chloromethane phosphonyl dichloride dissolved in 1200 ml. hexane at 2-4° C. with constant stirring over a period of 80 minutes. The resulting mixture is then stirred at room temperature for an additional 3 hours. Thereafter a solution of 98.2 g. diallylamine and 101.0 g. trimethylamine in 200 ml. hexane is added to the above mixture at room temperature over a period of 3 hours with continual stirring. Thereafter the reaction mixture is washed with water to remove the triethylaminehydrochloride. The remaining hexane layer is dried and the hexane evaporated whereby 270 g. cyclohexyl diallylamidochloromethanephosphonate (hereafter referred to as CDACP), is obtained which represented 92 percent of theory. (B.P. 122–124° C./0.05 Hg.)

The effectiveness of this compound as a contact herbicide may be illustrated by the following experiment. A plot containing two-week old plants of the type listed below are sprayed with 30 cc. of a 0.5 percent acetone solution of CDACP, which amounts to 10 pounds per acre, and then are observed 10 days later for injury with the following results:

| Plant | Extent of Injury by 0.5 percent Concentration |
|---|---|
| Grass | Dead. |
| Bean | Do. |
| Broadleaf | Severe. |
| Corn | Moderate. |
| Cotton | Severe. |
| Beet | Dead. |
| Radish | Do. |
| Buckwheat | Do. |
| Rye Grass | Do. |
| Wild Oats | Do. |
| Crabgrass | Do. |

As a control the same plants were sprayed with the acetone solution alone and showed no phytotoxicity.

*Example VII*

Cyclohexyl dipropylchloromethanephosphonate

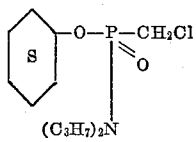

67 g. of the final product of Example VI is hydrogenated with hydrogen using a palladium catalyst under a pressure of 60 lbs./sq. in. and a temperature of 25-30° C. in the presence of 25 ml. toluene. Upon completion of the reaction the toluene is removed under reduced pressure and a temperature of 120° C. there is obtained 64.5 g. cyclohexyl dipropylchloromethanephosphonate. (B.P. 128° C./0.05 mm. Hg.)

*Example VIII*

Cyclohexyl dimethylamido-β-chloroethane phosphonate

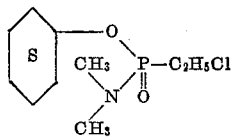

Employing the same procedure as set forth in Example IV above, but substituting 54.0 g. dimethylamidochloroethylphosphonyl chloride for the dimethylamidochloromethylphosphonyl chloride there is obtained cyclohexyl dimethylamidochloroethane phosphonate in good yield.

*Example IX*

Cyclohexyl dimethylamidochloromethanethiophosphonate

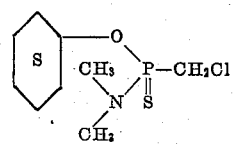

To 4.21 g. (0.183 mole) sodium is added 23.32 g. (0.183 mole+5.0 g. excess) cyclohexanol in the presence of 250 ml. toluene over a period of 2 hours at a reflux temperature of 110° C. This mixture is cooled to room temperature and thereafter 35.2 g. (0.183 mole) dimethylamidochloromethylthiophosphonyl chloride—

$$CH_2ClPCl(S)N(CH_3)_2$$

is added over a period of ½ hour and then stirred for 3 hours. The sodium chloride formed is removed by washing with water. After drying with anhydrous sodium sulfate the toluene is removed by distillation under reduced pressure and 24.0 g. of substantially pure cyclohexyl dimethylamidochloromethanethiophosphonate is obtained. Analysis found: N=5.51%; Cl=14.18%; calculated N=5.48; Cl=13.9%. (B.P. 105° C. at .06 mm., Hg.)

*Example X*

Cyclohexyl dimethylamidomethanethiophosphonate

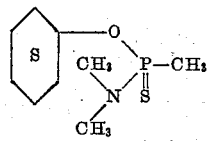

To 4.27 g. (0.186 mole) sodium is added an excess of cyclohexanol (26.0 g.) with stirring in the presence of 200 ml. toluene over a period of 2 hours at a reflux temperature of 110° C. and then stirred for another hour. The reaction mixture is cooled to room temperature and thereafter 29.3 g. (0.186 mole) dimethylamidomethylthiophosphonyl chloride is added at 15° C. and stirred for 4 hours. The sodium chloride formed is removed by washing with water. After drying with anhydrous sodium sulfate the toluene is removed by distillation under reduced pressure and 21.8 g. of substantially pure cyclohexyl dimethylamidomethanethiophosphonate is obtained. Analysis found: N=6.40%; Calculated N=6.33%; (B.P. 92–95° C. at .06 mm.)

*Example XI*

Cyclohexyl diallylamido β-chloroethane phosphonate

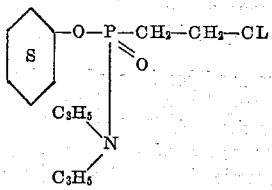

To a solution consisting of 200 ml. hexane and 18.1 g. (0.10 mole) β-chloroethyl phosphonyl dichloride (ClCH$_2$CH$_2$POCl$_2$) there is gradually added 10.0 g. (0.10 mole) cyclohexanol at 40° C. The hexane and the hydrochloride are then removed under vacuum. The residue is diluted with hexane following distillation of the hexane under reduced pressure. After the removal of all hydrogen chloride in this manner, the residue is dissolved in 300 ml. dioxane. Then 19.4 g. (0.2 mole) of diallyl amine is added to this residue in solution at 25° C. within a period of 20 minutes. The reaction mixture is then heated at 80° C. to complete the reaction. Thereafter the diallylamine hydrochloride is filtered off. The filtrate resulting therefrom is evaporated under vacuum and the residue washed with water. Then 100 ml. ether is added and the layers separated. The ether layer is dried with sodium sulfate and the ether and some low boiler are removed by subjecting the solution of vacuum. The oil remaining amounted to 18.6 g. which is a 61 percent yield of the desired cyclohexyl dipropylamido β-chloroethane phosphonate.

*Example XII* n-Propyl dimethylamido methane dithiophosphonate $$\begin{array}{c} C_3H_7-S \quad S \\ CH_3 \diagdown P-CH_3 \\ N \\ CH_3 \end{array}$$

To a suspension of 3.8 g. sodium in 200 ml. toluene at 105° C. are gradually added 13.0 g. normal propyl mercaptan with vigorous stirring. After all the sodium had reacted, 26.0 g. methanephosphonic acid-dimethylamido chloride is added to the reaction mixture at 40° C. with stirring over a period of 50 minutes. After cooling to room temperature, the reaction mixture is treated with 35 ml. water to dissolve the sodium chloride formed. The toluene layer is dried with sodium sulfate and distilled under reduced pressure (35 mm.). On redistillation there is obtained propyl dimethylamidodithiophosphonate (B.P. 73.0–74.0° C./0.15 mm.).

It is obvious that the foregoing examples are merely representative and that numerous other compounds of the general type of this invention may also be prepared in a similar manner, such as:

methyl diallylamidochloromethanephosphonate
cyclohexyl diethylamidomethanephosphonate
amyl dibutylamidochloromethanethiophosphonate
cyclohexyl diisopropylamidomethanephosphonate
cyclohexyl propylamidomethanephosphonate
cyclohexyl ethylamidoethanephosphonate
isopropyl dimethylamidomethanephosphonate
isopropyl dimethylamidoethanephosphonate
ethyl diethylamidomethanedithiophosphonate
butyl diethylamidochloroethanethiophosphonate
cyclohexyl diallylamidochloromethanethiophosphanate
methyl dimethylamidochloromethanethiophosphonate
cyclohexyl diethylamidochloromethanephosphonate
cyclohexyl dipropylamidochloromethanephosphonate
butyl dioctylamidochloropropanedithiophosphonate
ethyl dimethylamidomethanephosphonate
propyl diethylamidoethanephosphonate
cyclohexyl dimethylamidomethanedithiophosphonate
octyl dipropylamidomethanedithiophosphonate
octyl dimethylamidomethanephosphonate, and the like.

Various modifications of the invention as hereinabove set forth may be made without departing from the spirit and scope thereof. It is therefore to be understood that within the scope of the appended claims the invention may be practiced otherwise than as specifically prescribed.

What is claimed is:
1. Cyclohexyl diallylamidochloromethanephosphonate.
2. In a method of making a compound of the formula

$$\begin{array}{c} R-X \\ R' \diagdown P-(CH_2)_m(CHCl)_nH \\ N \; X \\ R'' \end{array}$$

where X is a member selected from the group consisting of oxygen and sulfur, R is a member selected from the group consisting of cyclohexyl and alkyl radicals having from 1 to 8 carbon atoms, R' is a member selected from the group consisting of allyl, hydrogen and alkyl radicals having from 1 to 4 carbon atoms and R" is a member selected from the group consisting of allyl, hydrogen and alkyl radicals having 1 to 4 carbon atoms, $n$ is an integer from 0 to 1, $m$ is an integer from 0 to 2, and the sum of $m+n$ is at least 1, the steps comprising reacting a compound of the class RXH, where R and X have the same meaning as above with (a) a phosphonyl compound of the formula $$\begin{array}{c} Cl \\ \diagdown P-(CH_2)_m(CHCl)_nH \\ Cl \; X \end{array}$$

where X, $m$ and $n$ have the same meaning as above and (b) an amine of the formula $$\begin{array}{c} R' \\ \diagdown NH \\ R'' \end{array}$$

where R' and R" have the same meaning.
3. Cyclohexyl diallylamido-β-chloroethanephosphanate.
4. Methyl diallylamidochloromethanephosphonate.
5. A compound of the formula $$\begin{array}{c} R-X \quad X \\ C_3H_5 \diagdown P-(CH_2)_m(CHCl)_nH \\ N \\ R' \end{array}$$

where each X is a member selected from the group consisting of oxygen and sulfur, R is a member selected from the group consisting of cyclohexyl and alkyl radicals having from 1 to 8 carbon atoms, R' is a member selected from the group consisting of hydrogen, allyl and alkyl radicals having from 1 to 4 carbon atoms, $n$ is an integer from 0 to 1, $m$ is an integer from 0 to 2, and the sum of $m+n$ is at least 1.
6. A compound of the formula $$\begin{array}{c} R-X \quad X \\ C_3H_5 \diagdown P-(CH_2)_m(CHCl)_nH \\ N \\ C_3H_5 \end{array}$$

where each X is a member selected from the group consisting of oxygen and sulfur, R is a member selected from the group consisting of cyclohexyl and alkyl radicals having from 1 to 8 carbon atoms, $n$ is an integer from 0 to 1, $m$ is an integer from 0 to 2, and the sum of $m+n$ is at least 1.
7. A compound of the formula $$\begin{array}{c} \text{C}_6\text{H}_{11}-O \quad O \\ C_3H_5 \diagdown P-(CH_2)_m(CHCl)_nH \\ N \\ C_3H_5 \end{array}$$

where $n$ is an integer from 0 to 1, $m$ is an integer from 0 to 2, and the sum of $m+n$ is at least 1.
8. The method of making a compound as defined in claim 7 which comprises reacting cyclohexanol with a phosphonyl compound of the formula $$\begin{array}{c} Cl \quad O \\ \diagdown P-(CH_2)_m(CHCl)_nH \\ Cl \end{array}$$

where $m$ and $n$ have the same meaning as above with diallylamine in the presence of a hydrogen chloride acceptor.

9. A compound of the formula
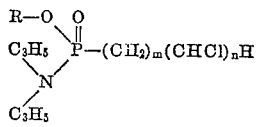
where R is an alkyl radical having from 1 to 8 carbon atoms, $n$ is an integer from 0 to 1, $m$ is an integer from 0 to 2, and the sum of $m+n$ is at least 1.
References Cited in the file of this patent
UNITED STATES PATENTS
2,765,276     Van Winkle et al. _____ Oct. 2, 1956
OTHER REFERENCES
Arbuzov et al.: Bull. Akad. Sci., U.S.S.R. Div. Chem. Sci. (English translation), 935–943 (1955).